INVENTORS
John P. Woods
Edwin B. Neitzel
Tom Prickett, Jr.

INVENTORS
John P. Woods
Edwin B. Neitzel
Tom Prickett, Jr.

INVENTORS
John P. Woods
Edwin B. Neitzel
Tom Prickett Jr.

United States Patent Office 3,303,459
Patented Feb. 7, 1967

3,303,459
COORDINATE ADJUSTMENT OF FUNCTIONS
John P. Woods and Edwin B. Neitzel, Dallas, and Tom Prickett, Jr., Richardson, Tex., assignors to The Atlantic Refining Company, Philadelphia, Pa., a corporation of Pennsylvania
Original application June 30, 1960, Ser. No. 39,876. Divided and this application Oct. 11, 1965, Ser. No. 494,738
6 Claims. (Cl. 340—15.5)

This application is a division of application Serial No. 39,876, filed June 30, 1960.

The present invention relates to an apparatus for fitting a function to predetermined indicia. More particularly, the present invention relates to an apparatus for adjusting a signal to fit preprinted indicia. In a still more specific aspect, the present invention relates to an apparatus for adjusting the abscissa of a seismic signal to fit equally spaced indicia on a particular visual display medium.

The problem of matching indicia is encountered in various fields and has been solved to some degree by the use of phase comparison. For instance, in operations where it is necessary to transfer intelligence from one record to another, it is essential to synchronize the record speeds. In this case, phase lock or phase comparison is used. Generally, this operation compares the phase shift of markings on the two records and adjusts the speed of one record to compensate for the phase shift. In other words, the movement of the two records is scanned and as a phase error develops, the speed of one record is automatically corrected.

As will be detailed hereinafter, the indicia matching problem is also present in seismic operations. Since the inception of seismic prospecting, efforts have continually been made to increase the amount of usable information that can be taken from seismograms. Various techniques and devices have been developed to increase signal-to-noise ratio and to better understand and interpret complicated reflection wavelets, etc. Presently, it is conventional to record the result of a seismic traverse on film or magnetic tape and then process it with a seismic computer. The computer usually operates on the recorded signals, corrects time distortion of signals caused by transmission through earth and geometry of layout, and re-records the modified signal either as a seismogram or as a cross-section plot of the earth's surface. For examples of such operations, see United States applications 749,190 and 761,044 (now Patent 3,175,182), owned by a common assignee. To further aid the geophysicist in interpreting the seismic information, the cross-section plots or seismograms are often presented in variable density or variable area form to emphasize anomalies and other subsurface information of interest.

Although the above-mentioned computers, cross-section plotters, etc., greatly aid the geophysicists, a source of error remains in these operations that seriously affects the accuracy of the final seismogram or cross-section plot. This error occurs when the originally recorded information is corrected and rerecorded on a medium with preprinted indicia such as preprinted depth or preprinted timing lines. Regardless of the type and quality of recording paper used, and to a lesser extent, the type of magnetic tape or the type of film used (if the record is to be reproduced photographically), temperature and humidity variations adversely affect the dimensions of the recording medium. In addition, other factors such as slippage, poor manufacturing control, etc., also add to the overall dimensional variations. For example, when the finest grade recording paper is used, a lengthwise (machine direction) variation of up to about one inch in one hundred inches can occur due to the various-described sources of error. This change in dimension causes the distance between the preprinted indicia to vary. However, numerous experiments have shown that as long as the medium is homogeneous, the error is linear; i.e., the incremental change between each two indicia is substantially the same. When information previously recorded along an axis having indicia representing time, depth, etc., is recorded on a medium containing preprinted indicia and the medium is affected by temperature, humidity, poor manufacturing control, etc., the two sets of indicia will not coincide. This lack of coincidence introduces a cumulative error into the newly recorded information, sometimes causing locations of formations near the end of the record to be in error as much as 200 feet.

Heretofore, this error has been either ignored or only roughly corrected. Various types of rough compensation are utilized, such as physically stretching the recording paper so that the indicia coincide or wetting the paper and allowing it to shrink to approximate the indicia on the original record. In addition, mathematical computations and film or original record manipulations are sometimes used.

The disadvantages of these rough corrections are obvious. They are inaccurate, time-consuming, expensive and usually require a large amount of specialized equipment.

The phase lock system, described heretofore, is not satisfactory for seismic operations because it is inaccurate and requires complicated circuitry. In addition, it is unsatisfactory because the original record and the re-recording medium are usually located on the same record drum. Even if the rerecording medium is not located on the original record drum, it is usually arranged in a position or in a manner not suitable for conventional phase lock operation. For instance, the display medium can be a flat surface record or film, a cathode ray tube, or other element equally unsuited for conventional rotary phase comparison.

Accordingly, it is an object of the present invention to provide an apparatus for fitting data to a particular display medium.

Another object of the present invention is to provide an apparatus for fitting data to the indicia of a display medium by modifying at least the abscissa or ordinate of the data.

Another object of the present invention is to provide an apparatus for fitting indicia of a previously recorded signal to preprinted indicia on a visual display medium by operating on the signal to make the indicia coincide.

Another object of the present invention is to provide an improved apparatus for fitting indicia of a previously recorded signal to preprinted indicia on a visual display medium by applying a total correction linearly to the signal.

Another object of the present invention is to provide an apparatus for fitting seismic data to a record with preprinted indicia.

Other and further objects of the instant invention will be apparent from the following detailed description of the present invention.

In accordance with the instant invention, it has been found that record dimension variation can be accurately compensated for by operating on data during visual presentation operations. More specifically, it has been found that variations in the distance between preprinted indicia can be accurately compensated for by operating on the data to be recorded during the process of presenting the data on the medium containing the preprinted indicia.

Accordingly, the present invention can be briefly described as an apparatus for fitting indicia of a function to preprinted indicia on a visual presentation medium. The apparatus includes a correction voltage source means developing a total correction voltage, a correction command generator means, a signal transfer means and a corrector means for recording the function on the presentation medium in the same relationship to the preprinted indicia as it was recorded to its original indicia.

The invention can be practiced by various type of apparatus—automatic, semiautomatic, and even hand-operated if necessary. As will be set forth in more detail hereinafter, the method itself can be performed in digital or analog fashion and with a minimum of complicated equipment.

Referring to the accompanying drawings.

Figure 1:
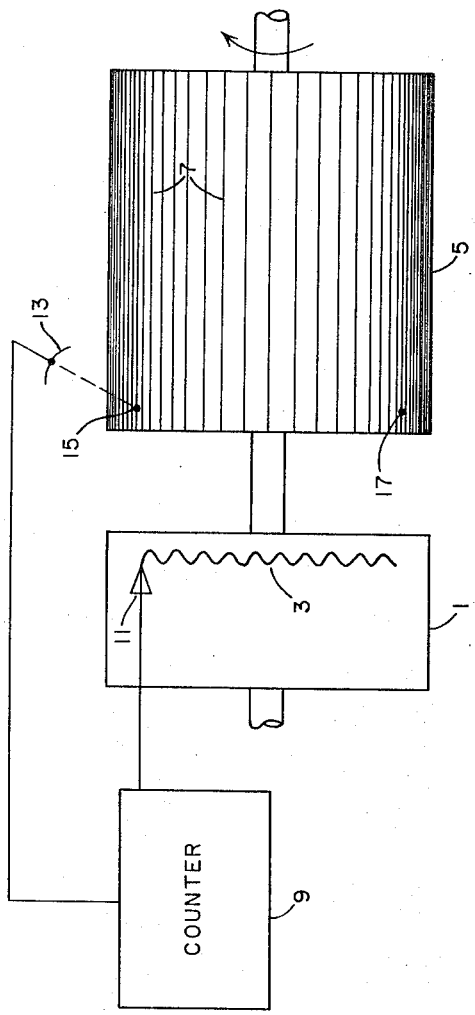
FIGURE 1 illustrates a device for determining recording medium variation.

FIGURE 1 discloses a device for determining linear variation in a recording medium. The purposes of the device or error detector is to ascertain either semiautomatically, or automatically, distortion in the final display medium. The total error or distortion (plus or minus) is determined so that the error may be corrected linearly as a prerecoded function is rerecorded on the visual display medium. Since the visual display medium always contains some type of preprinted or prerecorded indicia, the abscissa indicia (or in some cases, abscissa and/or ordinate indicia) on the original record is compared to the display medium indicia to determine the overall variation or error.

Again referring to FIGURE 1, original record 1 bears oscillatory indicia signal 3 or other type of indicia as desired. Final or visual display record 5 bears preprinted indicia 7. Counter (or counters, depending on the device) 9 scans indicia 3 with read head 11 and preprinted indicia 7 with read head 13. Start indicia 15 and stop indicia 17 are positioned at the beginning and at the end of the preprinted indicia on medium 5. In operation, read head 13 scans indicia 7 and read head 11 simultaneously scans indicia 3. Start indicia 15 activates counter 9 and stop indicia 17 deactivates the counter after the scanning operation is completed. The lengthwise variation between points 15 and 17 and corresponding indicia on medium 1 can be determined in several different ways. If automatic operation is desired, indicia 3 is made a standard set of indicia and equal in number to indicia 7. For purposes of this illustration, consider time breaks 27, FIGURE 2, as the standard set of indicia. The stretch or shrink error can be determined by arranging the counters to indicate the difference in distance (representing time, length, etc.) in the indicia scanned by heads 13 and 11. This plus or minus difference can be produced in digital form or in terms of an output voltage by any one of various circuits well-known to those skilled in the art.

If semiautomatic operation is desired, the counters in the above-described device can be arranged to present the difference or error in numerical form. Various counters capable of visual presentation are available on the market today and well-known to those skilled in the art. The numerically presented error can then be manually set on a calibrated potentiometer in the input circuit of the correction command generator 21, FIGURE 2.

Figure 4:
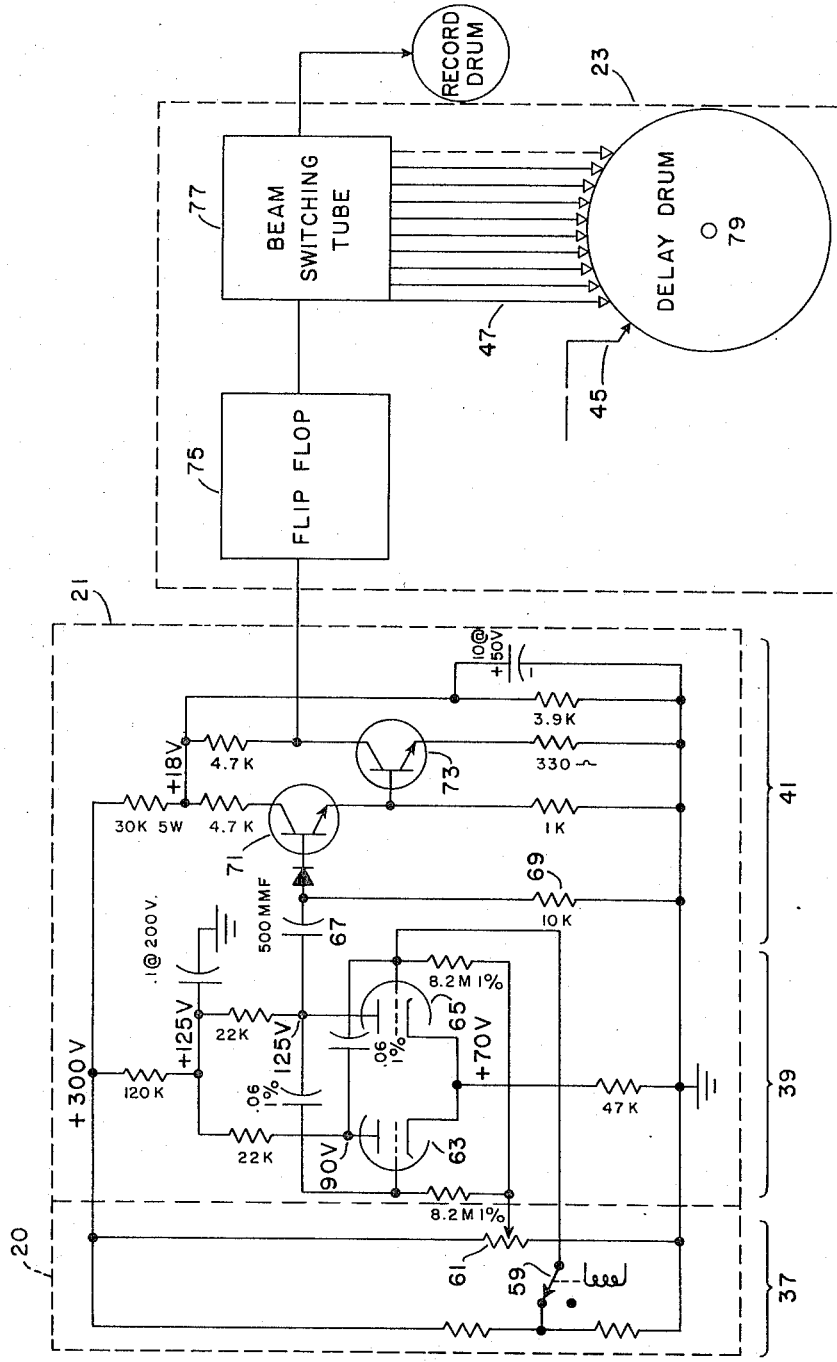
FIGURE 4 illustrates a preferred embodiment of a device for performing the digital method of operation.

For a manual determination of the distortion, see the discussion of FIGURE 4.

Figure 2:
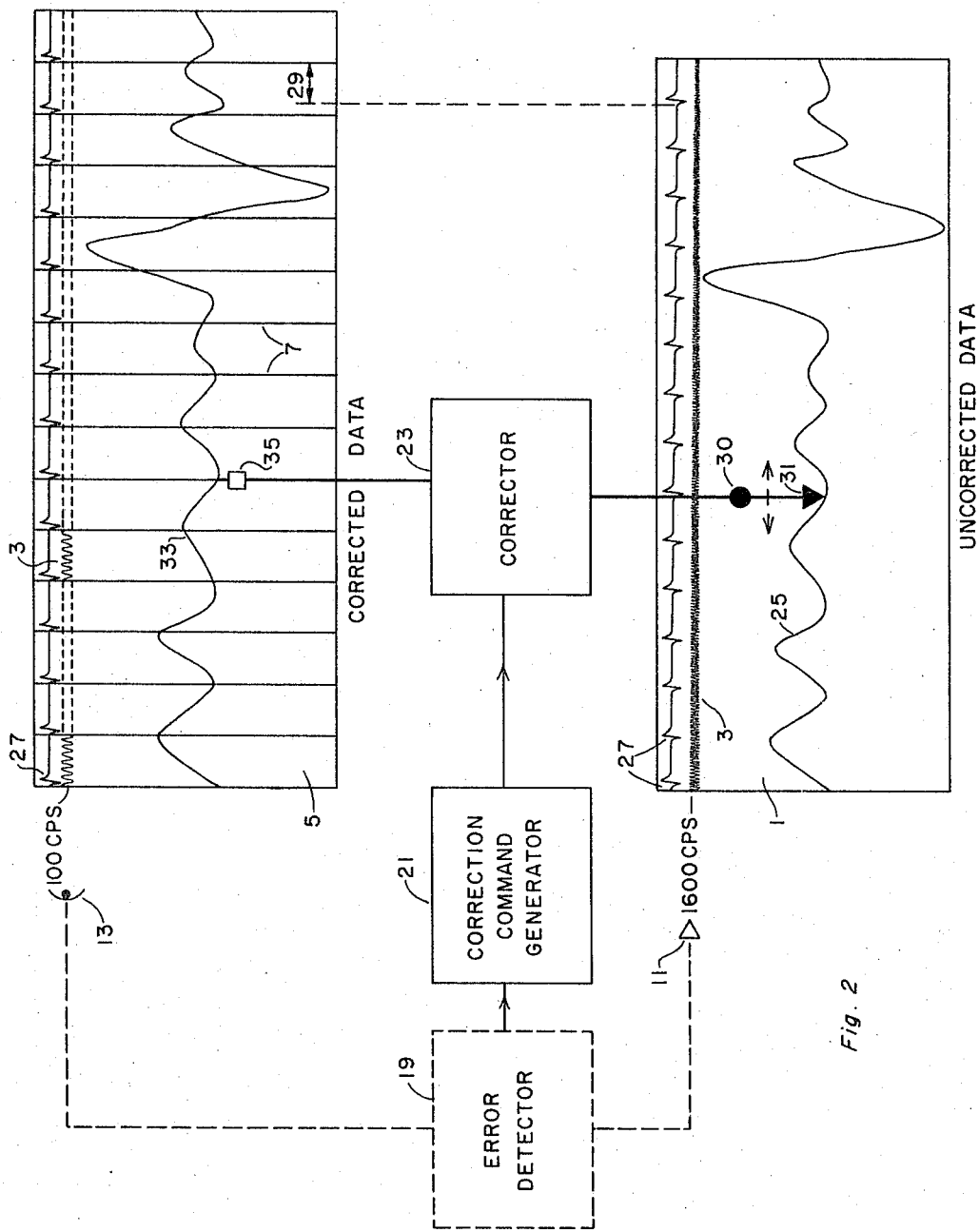
FIGURE 2 illustrates in block diagram form a device for practicing the overall invention.

FIGURE 2 broadly discloses a device that is capable of fitting indicia of a function to preprinted indicia. The dotted portion of the drawing shows that the error detector in FIGURE 1 can be adapted to work with the device for fitting the abscissa indicia to the preprinted indicia if automatic operation is desired. Block 19 represents an error detector such as shown in FIGURE 1. Block 21 represents a correction command generator which receives the total error and translates it into the proper commands for the correcting device shown in block 23. For purposes of simplicity and ease of explanation, assume that previously recorded record medium 1, shown in FIGURE 1 and FIGURE 2, is a portion of a seisomogram recorded on magnetic tape and that medium 5, shown in FIGURE 1 and FIGURE 2, is a record chart containing preprinted timing lines 7. For purposes of illustration, magnetic record 1 shown in FIGURE 2 is pictured as it would look if it were "dusted" to show the magnetic recording, detected, and magnified to compensate for the scale difference between conventional magnetic tape and visual presentation chart 5. Magnetic record 1 contains timing signal 3 and a continuously recurring time break signal 27. Of course, any type of regularly occurring indicia can be used if the period is suitable. Visual presentation chart 5 contains timing signal 3′, in this case a multiple of signal 3, and time break signal 27. Due to humidity and temperature variations as well as other sources of error, record 5 has stretched a distance 29. Error 29 has distorted the positions of preprinted timing lines 7 as shown. In order to compensate for the stretch correction, error detector 19 has determined total stretch 29 by one of the methods described heretofore. This total error has been applied either manually or electrically through a correction voltage source, not shown, to correction command generator 21. Head 31, as part of means for transferring data, reads data 25 and corrections device 23 operates on the data so that it can be rerecorded in corrected form at data 33 on medium 5 with pin 35. As will be explained in more detail hereinafter, the corrected data 33 has now been corrected to compensate for the distortion error 29 in medium 5. That is, significant features of data 33 are in the same relation to preprinted timing lines 7 as the corresponding features of data 25 are to time break signals 27.

Various methods can be used to practice applicant's novel invention and, as obvious to one skilled in the art, various apparatus can be used to practice each method of operation. Therefore, let us consider each method of operation individually.

*Digital method*

Figure 3:
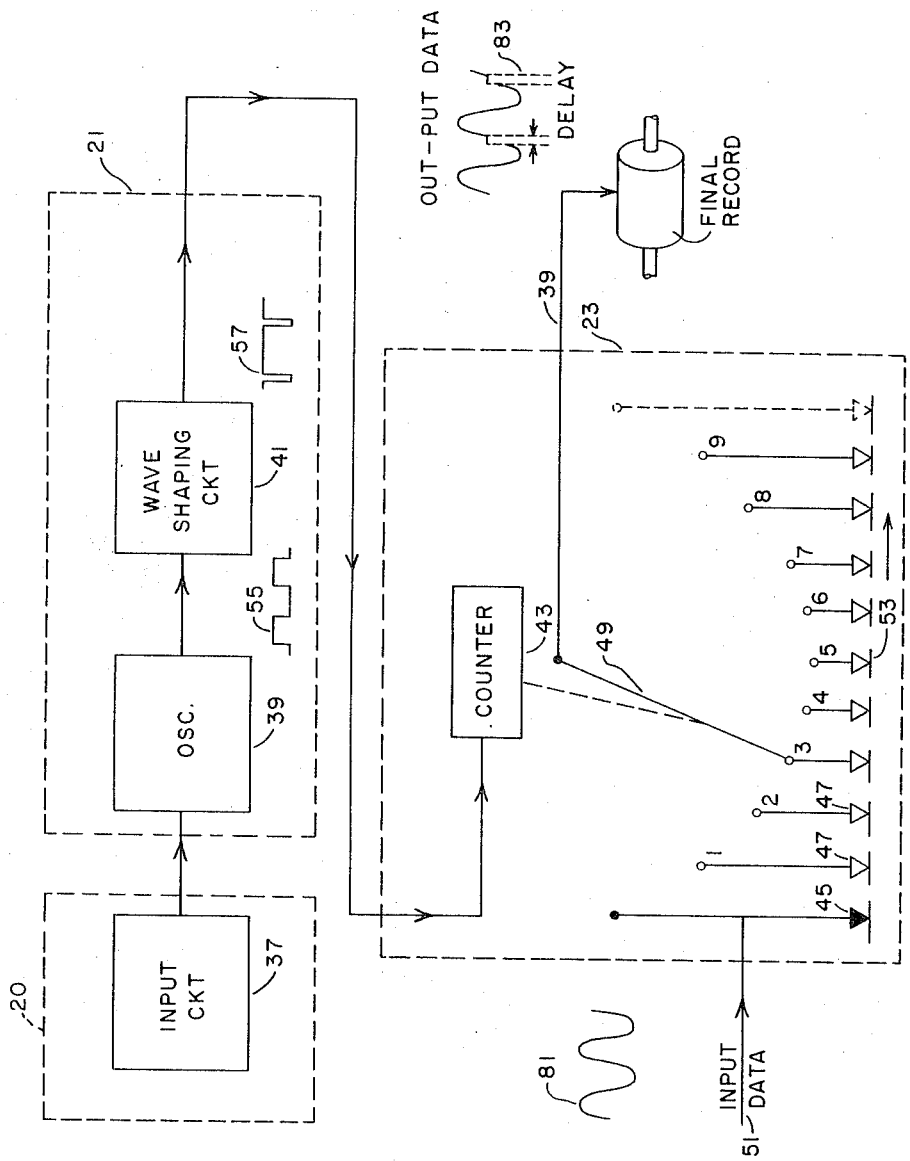
FIGURE 3 illustrates in block form a device for practicing the invention in digital form.

Referring now to FIGURE 3, let us broadly consider the operation of a device capable of practicing the invention in its digital form. Dashed block 20 represents a correction voltage source and includes input circuit 37. Dashed block 21 corresponds to correction command generator 21 in FIGURE 2. Dashed block 23 corresponds to correction device 23 shown in FIGURE 2. In this embodiment, the correction command generator includes oscillator 39 and an optional wave shaping circuit 41. The correction device 23 comprises a suitable variable delay line shown here in the form of a magnetic delay line comprising a counter 43, switch 49, write head 45, and magnetic read heads 47. Magnetic read heads 47 are sequentially selected by switch 49 which is controlled by counter 43 at the command of correction generator 21.

In operation, an uncorrected signal 25, FIGURE 2, is applied to input 51 and recorded magnetically on tape 53. Prior to this operation, total correction 29 has been determined as described heretofore and manually or electrically applied to input circuit 37. The correction set in circuit 37 determines the output frequency of oscillator 39. Output wave 55 from the square wave oscillator is fed to the wave-shaping circuit where it is differentiated and clipped. It should be noted at this point that the wave-shaping circuit 41 is not essential to the operation of the invention. However, it is used in this embodiment so when desired additional counter inputs can be easily applied from other correction sources such as described in copending application 761,044, now Patent 3,175,182. The wave-shaping circuit output 57 appears as a negative pulse train whose frequency remains the same as wave train 55. Counter 43 is actuated by pulse train 57 in such a manner as to sequentially switch arm 49 from one read head 47 to the next. As the uncorrected input data 25 is recorded on tape 53 by head 45, periodic incremental delays are introduced and equally spaced along the length of the signal by sequentially switching from one read head 47 to the next as dictated by commands from the counter. In effect, by utilizing a plurality of discrete delays applied in a linear fashion over the length of the signal, uncorrected data 25 is modified to fit the preprinted timing lines 7, FIGURE 2, on the visual display medium 5.

In order to enable the above-described operation to compensate for shrinkage as well as stretch, a delay of 500 milliseconds is added to all signals initially. The developed corrections are added to or subtracted from this initial delay. Of course, 500 milliseconds is not a critical amount and other suitable delays can be used depending on the operation.

Referring now to FIGURE 4, let us examine the preferred embodiment of the digital device shown in FIGURE 3 and note its detailed operation.

FIGURE 4 illustrates in detail correction voltage source shown in dashed block 20 and the correction command generator shown in dashed block 21 of FIGURE 3. The correction device in dashed block 23 is shown in block form using conventional circuit elements, the operation of which is described in detail in copending application 761,044, now Patent 3,175,182. Components of the correction command circuit are labeled to correspond with their appropriate block in FIGURE 3. Of course, other obvious variations and components can be substituted for those shown in FIGURE 4; however, FIGURE 4 is the preferred embodiment. The input circuit 37 includes off-on switch 59 and potentiometer 61. The oscillator 39 is a multivibrator-type oscillator comprising tubes 63 and 65. The wave-shaping circuit 41 includes integrator capacitor 67 and resistor 69, and transistors 71 and 73. The correction device shown in dashed block 23 includes a conventional type flip flop 75 and a "Burroughs Beam Switching Tube" 77 connected as a distributor to a number of read heads 47. The use of flip flop 75 is optional; however, it is used in this case to develop signals into a form suitable to drive grids of the switching tube 77. As pointed out heretofore, other types of variable delay lines may be used, but it has been found that a magnetic delay line using a switching tube is most satisfactory. As explained in copending application 761,044, now Patent 3,175,182, the lowest incremental value or the number of significant figures used determines the number of switching tubes required.

To consider the complete operation of the device, let us assume that original data 25, FIGURE 2, is part of a field record made during a seismic survey. Before this record can be interpreted, it is conventional to remove the static and normal moveout errors and present it as a corrected seismogram or as part of a cross-section plot on recording paper with preprinted timing lines 7. As pointed out earlier, this operation is usually accomplished by a seismic computer.

At this time, note the error 29 that would be introduced if data 25 were recorded without modification on record 5.

Due to temperature and humidity variations, etc., recording paper 5 has expanded moving timing lines 7 out of coincidence with the timing lines on record 1.

Applicants' method and apparatus are used to modify data 25 as it is rerecorded on record paper 5 so it will fit the new positions of timing lines 7 as shown in FIGURE 2.

The operation generally is as follows:

(1) The total correction 29, FIGURE 2, is developed. The determination can be made automatically as described heretofore or manually. One way that this can be done manually is to reposition head 31 with knob 30 so that as the head reads data 25 (and head not shown reads recurring time break 27), recording pen 35 causes the first time break 27 to coincide with the first preprinted timing line 7 on record 5. The entire group of time breaks 27 on record 1 are then played out and recorded on record 5. The difference between the last preprinted timing line 7 and the last time break 27 recorded on 5 is the maximum difference in spatial position or the total error to be corrected. In FIGURE 2, the difference is shown as distance 29. (It should be noted that although error 29 is shown on record 5, FIGURE 2 shows record 5 after the proper stretch correction has compensated for the error. Data 33 and time breaks 27 are therefore in their proper location on chart 5.) To further illustrate the problem and simplify mathematics to be used in later discussions, let us assume that distance 29 measures five milliseconds and that the total length of the record 5 is 4,000 milliseconds.

(2) The total correction is represented as an electrical quantity. In this case, the total correction in milliseconds is set on calibrated potentiometer 61, FIGURE 4, in the input circuit. Of course, in automatic operations, the error voltage would be applied to the input from error detector 19 as shown in FIGURE 2. The potentiometer setting determines the output frequency of oscillator 39 as well as of the overall command generator 21. Assuming that the five millisecond correction is set on calibrated potentiometer 61 and that one pulse of the oscillator gives one millisecond of stretch or delay, the output frequency of multivibrator oscillator 39 becomes 1.25 cycles per second. The square wave output 55, FIGURE 3, of multivibrator 39 is transmitted to the wave-shaping circuit 41. Capacitor 67 and resistor 69, FIGURE 4, differentiate wave train 55, FIGURE 3, producing characteristic spikes at the leading and trailing edges of the square waves. Transistors 71 and 73, FIGURE 4, amplify, clip, and invert the integrated wave train, producing an output train of negative pulses shown as 57 in FIGURE 3. In this example, the width of each negative pulse is 20 microseconds as determined by the time constant of the integrating circuit. It should be remembered that the frequency of the negative-going pulse train remains 1.25 cycles per second as determined by the setting on potentiometer 61.

(3) The electrical quantity is applied linearly to the data to be recorded. This quantity shown as pulse train 57 in FIGURE 3 is applied to the data through flip flop 75 and switching tube 77. In other words, the total correction set in potentiometer 61 and which is represented as a pulse train 57 is linearly applied to the data by the switching action of "Burroughs Beam Switching Tube" 77. The presence of flip flop 75 in the correction device is optional. In this case, it is used to present signal train 57 in the proper form to drive the grids of "Burroughs Beam Switching Tube" 77.

If other well-known types of switching devices are used, the presence of the flip flop may not be necessary.

(4) The applied electrical quantity modifies the time base of the data as it is re-recorded. Assuming that input data 25, FIGURE 2, is applied to write head 45, FIGURE 4, the recorded information is moving clockwise on drum 79 and modified by the sequentially actuated read heads 47. As explained in copending application 761,044, now Patent 3,175,182, the delay introduced by, or the distance between, each magnetic head can be varied. For purposes of illustration, assume that the distance between each head introduces a delay of one millisecond in a conventional manner. Therefore, it is clear as each pulse of wave form 57 triggers switching tube 77, the next adjacent readout head is activated and an additional incremental delay of one millisecond is added to the input data. For a more simplified illustration, refer to FIGURE 3. Assume that sample input signal 81 is recorded on tape 53 by write head 45. Each time a command pulse form wave 57 pulses counter 43, switch arm 49 is moved to the next read head. This movement introduces a delay of one millisecond. Output 83 shows in highly exaggerated form the effect of the delay on the signal and how in the original case input data 25, FIGURE 2, is stretched to fit the preprinted timing lines 7 on record 5. It should be understood, of course, that in actual practice, the regularly spaced discrete incremental delays are so minute in comparison with the signal that they do not impair the fidelity nor the character of the data. The pulse train 57 applied to the switching tube 77 of FIGURE 4 modifies the input data in the same way as described above.

*Analog operation*

Let us now consider a device capable of practicing the analog form of the invention.

Figure 5:
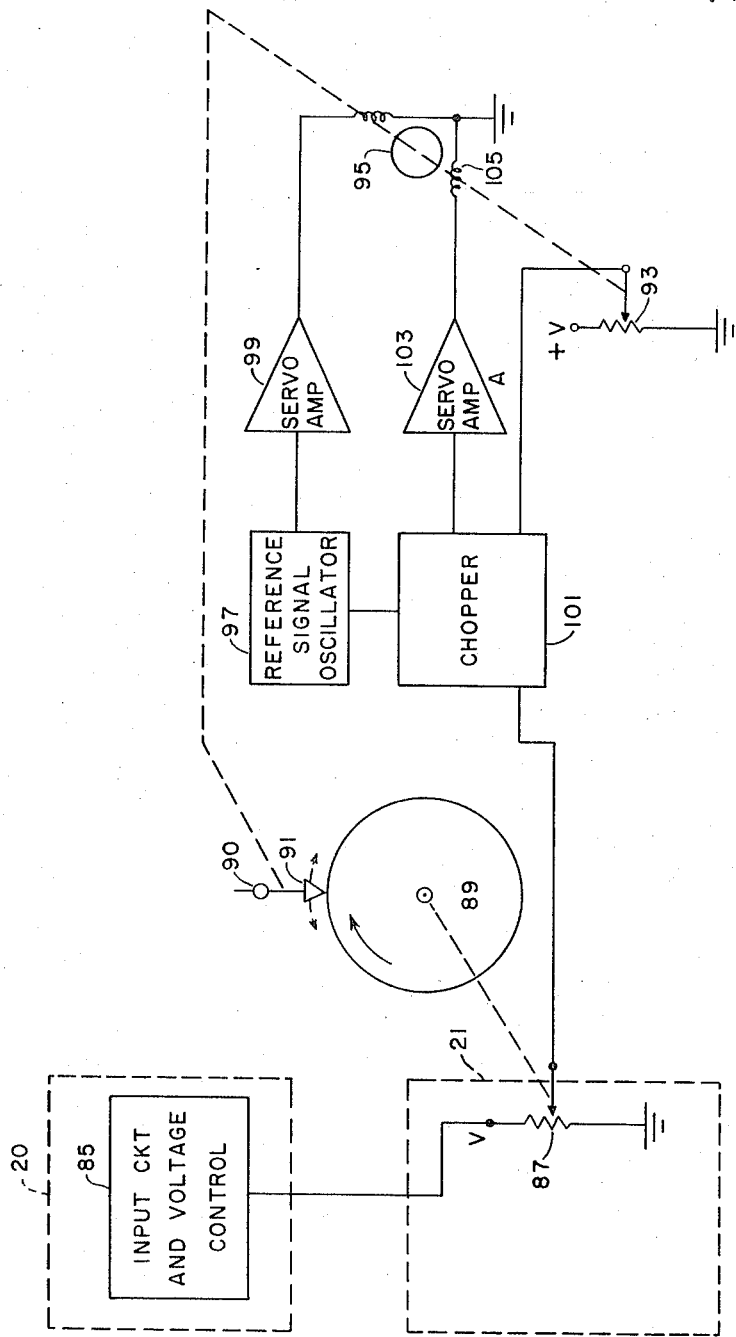
FIGURE 5 illustrates in schematic form a device for practicing the invention in analog form.

FIGURE 5 discloses a schematic of an apparatus capable of practicing the analog method of operation. The portion in dashed block 21 represents the correction command generator and the remainder of the figure represents the correction device. The correction voltage source includes an input circuit and a voltage supply 85. The correction command generator includes a potentiometer 87 connected to drum 89. The correction device includes drum 89, arcuately movable read head 91, and potentiometer 93 coupled to the shaft of servomotor 95, reference signal oscillator 97 connected to servoamplifier 99 and to drive chopper 101, and servoamplifier 103 also connected to chopper 101.

In operation, the total error or correction to be made can be determined as described in the operation of the digital machine; i.e., by automatic or manual means already described. Assuming the same correction, 5 milliseconds, is to be used, the correction is set on a calibrated potentiometer not shown in block 85 so that the voltage appearing at the top of potentiometer 87 represents the total correction in terms of voltage. As the drum 89 rotates, potentiometer 87 connected to drum 89 is moved from the zero voltage position toward the maximum correction voltage position. The continuously increasing voltage from potentiometer 87 is fed to chopper 101 and the operation of the servosystem performs in a conventional manner. That is, chopper 101 compares a voltage from potentiometer 93 with the continuously increasing signal from 87. As the chopper detects an error, signal, or variation, power is applied to winding 105, causing the servomotor to rotate, moving read head 91 and potentiometer 93 in the direction to balance the signal from potentiometer 87.

Therefore, by continuously introducing an increasing correction signal, read head 91 introduces a continuously increasing delay (from zero to the amount of total correction) causing previously recorded input data 25, FIGURE 2, to be stretched in a continuous manner to fit the preprinted timing lines on the record medium. Of course, it is understood that an opposite polarity correction would move 91 in the opposite direction and result in shrinkage of the data to fit appropriate timing indicia. For a more detailed description of the analog-type correction, see copending application 749,190.

The above-described operation can be practiced by hand at reduced drum speeds. For hand operation, the outputs from potentiometers 87 and 93 are connected to a bridge circuit and a null indicating meter instead of the chopper 101. Head 91 is manually controlled instead of servo controlled. As drum 89 rotates and the error signal 87 increases, the operator manually adjusts the position of head 91 so that the bridge meter remains at the null position.

Although the apparatus has been illustrated for operation on seismic data, it is obvious that the invention is just as appropriate for other operations requiring the adjustment of data to preprinted timing lines or other co-ordinating indicia. Therefore, it is to be observed that although specific embodiments of the instant invention have been illustrated and described herein, various modifications and substitutions may be made, which will be obvious to those skilled in the art, without departing from the scope of the present invention which is limited only by the appended claims.

We claim:
1. An apparatus for fitting a signal, prerecorded on X and Y axes having amplitude represented on the Y axis and original indicia spaced along the X axis indicating locations of significant features of said signal, to corresponding preprinted indicia spaced along the X axis of a visual presentation medium wherein at least two of the preprinted indicia on the visual presentation medium occupy different relative spatial positions along its X axis than the corresponding original indicia of the prerecorded signal, comprising
    (a) a correction voltage source means developing a predetermined total correction voltage proportional to the total difference in the relative spatial positions of selected original indicia and the corresponding preprinted indicia;
    (b) a correction command generator means connected to the output of said correction voltage source for evenly distributing said total correction voltage as the prerecorded signal is reproduced;
    (c) a signal transfer means for reproducing said prerecorded signal and presenting said prerecorded signal on said visual presentation medium in visible form; and
    (d) a corrector means connected to the output of said correction command generator for responding to the distributed total correction voltage in a manner to adjust the length of said prerecorded signal as it passes through said signal transfer means thereby allowing said prerecorded signal to be presented on said visual presentation means in the same relationship to the prerecorded indicia as it was recorded to the original indicia.

2. An apparatus in accordance with claim 1 wherein the corrector means is a delay means.

3. An apparatus in accordance with claim 1 wherein the corrector means includes an arcuately moving transducer.

4. An apparatus in accordance with claim 1 wherein the correction command generator means includes a potentiometer and the corrector means includes a rotatable drum and a transducer adapted to move around at least a portion of said drum.

5. An apparatus in accordance with claim 1 wherein the correction command generator means includes an oscillator means and wave shaping means connected in series and the corrector means includes a wave shaping means operatively connected to a switching means.

6. An apparatus in accordance with claim 5 wherein the switching means includes an electronic switching tube.

References Cited by the Examiner
UNITED STATES PATENTS

| | | | |
|---|---|---|---|
| 3,041,578 | 6/1962 | Elliott | 340—15.5 |
| 3,110,878 | 11/1963 | Horeth et al. | 340—15.5 |
| 3,206,720 | 9/1965 | Kerr | 340—15.5 |

BENJAMIN A. BORCHELT, *Primary Examiner.*

SAMUEL FEINBERG, *Examiner.*

R. M. SKOLNIK, *Assistant Examiner.*